United States Patent [19]

Suda et al.

[11] 3,929,910

[45] Dec. 30, 1975

[54] PROCESS FOR SEPARATING RESORCINOL FROM HYDROQUINONE

[75] Inventors: Hideaki Suda, Takaishi; Iwao Dohgane, Nishinomiya; Takashi Chinuki, Toyonaka; Kenji Tanimoto; Hirokazu Hosaka, both of Minoo; Yukimichi Nakao, Kobe; Yuji Ueda, Izumiotsu; Seiya Imada, Sakai; Hideki Yanagihara, Toyonaka; Kunihiko Tanaka, Ibaragi, all of Japan

[73] Assignee: Sumitomo Chemical Company, Limited, Osaka, Japan

[22] Filed: Nov. 19, 1973

[21] Appl. No.: 417,191

[30] Foreign Application Priority Data

Nov. 21, 1972 Japan.............................. 47-117447

[52] U.S. Cl............................................. 260/621 B
[51] Int. Cl.²................... C07C 37/22; C07C 37/26
[58] Field of Search...................... 260/621 A, 621 B

[56] References Cited

UNITED STATES PATENTS

| | | | |
|---|---|---|---|
| 1,908,817 | 5/1933 | Britton et al.................... | 260/621 B |
| 1,980,901 | 11/1934 | Bentley et al................... | 260/621 B |
| 2,433,143 | 12/1947 | Mohrman........................ | 260/621 B |
| 2,785,205 | 3/1957 | Jacobs............................ | 260/621 B |
| 2,862,857 | 12/1958 | Filar............................... | 260/621 B |

*Primary Examiner*—Norman Morgenstern
*Attorney, Agent, or Firm*—Stevens, Davis, Miller & Mosher

[57] ABSTRACT

Pure resorcinol and pure hydroquinone are obtained separately in a simple and efficient manner from their mixture at any mixing ratio by mixing the mixture with 15–30% by weight of an aqueous methanol solution containing 5–50% by weight of water, the former percentage being based on a total of the mixture and the aqueous methanol solution, and by successive fractional crystallization and separation.

2 Claims, No Drawings

PROCESS FOR SEPARATING RESORCINOL FROM HYDROQUINONE

This invention relates to a process for separating resorcinol and hydroquinone from each other by treating a mixture of resorcinol and hydroquinone with a solution of water and methanol.

According to the present invention, pure resorcinol and pure hydroquinone can be very simply and efficiently obtained from a mixture of resorcinol and hydroquinone in any proportion.

Separation of resorcinol and hydroquinone from each other is relatively new problem. That is, resorcinol and hydroquinone have been so far obtained independently, and there has been no necessity for separating resorcinol and hydroquinone from each other in an industrial scale almost at all. However, with the recent progress and development of organic synthesis chemistry, it is possible to produce the so-called hydroxy compounds including resorcinol and hydroquinone directly at the same time, and thus a development of an art of successive separation of resorcinol and hydroquinone from each other from their mixture is in demand.

Distillation, sublimation, crystallization, etc. seem to be useful as processes for separating resorcinol and hydroquinone from each other, but it is practically impossible or very difficult to completely separate resorcinol and hydroquinone from each other by any of these processes, and industrial-scale separation of resorcinol and hydroquinone has not yet been established.

Taking these problems into account, the present inventors have already proposed a process for separating resorcinol and hydroquinone with a specific solvent, which can substitute said conventional processes. The present inventors have also proposed that one of the specific solvents is an alcohol, and especially methanol has an excellent ability as the separating solvent.

When a mixture of resorcinol and hydroquinone is treated with methanol to separate resorcinol and hydroquinone from each other, resorcinol having an almost 100 % purity as an absolute purity can be readily obtained, but hydroquinone of 100 % absolute purity cannot be obtained, because hydroquinone forms a clathrate together with methanol. That is, even if hydroquinone completely freed from resorcinol is obtained, hydroquinone of 100 % absolute purity cannot be obtained, because the hydroquinone includes some amount of methanol. Therefore, it is necessary, for example, to treat the hydroquinone with water to decompose the clathrate to hydroquinone and methanol to obtain hydroquinone of truly 100 % absolute purity. In case where resorcinol and hydroquinone are separated from each other with methanol in this manner, it is thus necessary to use other solvent than methanol, for example, water, to decompose the clathrate and obtain 100 % hydroquinone as the absolute purity. This means that two different solvent systems, that is, a methanol system and water system are necessary for the practical separation process. The resorcinol or hydroquinone that fails to be separated and recovered by one operation is usually joined with a fresh feed for the separation, and recycled to the separation process. However, the individual different solvents must be completely and independently recovered in their respective steps. This procedure brings about not only an economically great disadvantage, but also less of resorcinol of hydroquinone due to deterioration by heat that must be supplied at the recovery of the solvent. That is, this procedure will make the process very complicated.

The present inventors have studied a separation process, which can be carried out only by changing kinds of solvent, mixing ratio and amount of solvents, and as a result have found such a surprising fact that a solution of methanol and water is the most suitable solvent for separating resorcinol and hydroquinone from each other from their mixture.

Thus, the present invention is to provide a process for separating resorcinol and hydroquinone from each other from their mixture, which comprises mixing a mixture of resorcinol and hydroquinone with 15 to 30 % by weight of an aqueous methanol solution, based on a total of the mixture and the aqueous methanol solution, separating the resulting slurry into a resorcinol-rich mother liquor and a hydroquinone-rich crystal, and subjecting independently the mother liquor and the crystal to fractional crystallization.

The present process will be explained in detail below.

A mixture of resorcinol and hydroquinone has an eutectic point at a mixing ratio of resorcinol to hydroquinone of approximately 80:20, and it is impossible to separate the mixture into each pure component by crystallization. Even in the recrystallization process of a ternary system of resorcinol-hydroquinone-water, there is also a point similar to said eutectic point. Such point will be hereinafter referred to as pseudoeutectic point, and the composition of resorcinol and hydroquinone at that point will be hereinafter referred to as pseudo-eutectic composition. Said pseudo-eutectic composition is not changed by the treating conditions, that is, temperature, amount of water, etc. That is to say, a ratio of resorcinol to hydroquinone is not changed thereby, but is kept constant at approximately 80:20, and thus resorcinol and hydroquinone cannot be separated from each other by recrystallization using only water.

On the other hand, in the ternary system of resorcinol-hydroquinone-methanol, the pseudo-eutectic composition is effectively shifted in a wide range by the treating conditions such as treating temperature, amount of methanol, etc. That is, a ratio of resorcinol to hydroquinone can be shifted in an expanded range of 83-93 : 17-7, and therefore the mixture of resorcinol and hydroquinone can be separated into the respective pure component by utilizing said shifting difference. It is assumable from these facts that the pseudo-eutectic composition of a quaternary system of resorcinol-hydroquinone-water-methanol would be such that a ratio of resorcinol to a total of resorcinol and hydroquinone be between 80 and 93 %, but actually such assumption is not correct. That is, the present inventors have found a surprising fact that the ratio of resorcinol to the total or resorcinol and hydroquinone can be shifted up to maximum 95 %. It is quite a surprising fact that, when a mixture of resorcinol and hydroquinone is admixed with a solution of water and methanol, the resulting pseudo-eutectic point is not included between the eutectic point of the ternary system including water as the third component and that of the ternary system including methanol as the third component, but is further shifted to the resorcinol side. This fact is quite different from the common sense assumption derived from the results of determination of the heat of solution or solubility of a mixture of resorcinol and hydroquinone in water and methanol. This fact has been found, for the first time, by the present inventors. One example of relations between the composition of water-methanol and the pseudoeutectic point determined under definite conditions at temperature of 0°C is given in Table 1. In the present invention, separation of resorcinol and hydroquinone is carried out on the basis of the finding of this new fact.

Table 1

| Solvent composition | | Pseudo-eutectic composition | |
|---|---|---|---|
| Water | Methanol | Resorcinol | Hydroquinone |
| 100 | 0 | 80.7 | 19.3 |
| 80 | 20 | 84.9 | 15.1 |
| 60 | 40 | 86.4 | 13.6 |
| 50 | 50 | 88.2 | 11.8 |
| 40 | 60 | 89.8 | 10.2 |
| 30 | 70 | 92.3 | 7.7 |
| 20 | 80 | 93.5 | 6.5 |
| 10 | 90 | 94.6 | 5.4 |
| 5 | 95 | 93.3 | 6.7 |
| 2 | 98 | 92.8 | 7.2 |
| 0 | 100 | 92.6 | 7.4 |

Now, the present process will be explained in more detail below, and hereinafter % is by weight.

Methanol containing 2 to 80 % by weight (hereinafter all % are by weight) of water is added to mixture of resorcinol and hydroquinone, in an amount of 15 to 30 % on the basis of total of said mixture of resorcinol and hydroquinone and said methanol containing water, and the resulting mixture is recrystallized in a temperature range of −10°C to 90°C. Especially by controlling a temperature just before separation of crystals and a mother liquor in a range of −10°C to 30°C, hydroquinone-rich crystals having a ratio of resorcinol to hydroquinone of 50–10 : 50–90 and resorcinol-rich mother liquor having a ratio of resorcinol to hydroquinone of 85–95 : 15–5 can be obtained (first stage separation).

As is seen from the fact that both the eutectic point of the resorcinol-hydroquinone system and the pseudo-eutectic point of the resorcinol-hydroquinone-water-methanol system are located at the resorcinol-rich side, it is naturally important how to obtain the resorcinol-rich mother liquor in the first stage separation, and the ratio of resorcinol to hydroquinone of the hydroquinone-rich crystals is not so important as that of the resorcinol-rich mother liquor. That is to say, in order to advantageously conduct the successive second stage separation step of the resorcinol-rich mother liquor, it is necessary that the ratio of resorcinol to the total of resorcinol and hydroquinone contained in the mother liquor resulting from the first stage separation is 85 % or more, and if said ratio is less than 85 %, the purity and yield of resorcinol will be lowered. This is very disadvantageous.

Therefore, when the separation is carried out under conditions that fail to meet said, so-called optimum conditions, for example, under such conditions that a water content of methanol to be used exceeds 60 %, particularly 50 %, or a mixing ratio of methanol containing water is less than 15 % or more than 30 %, or the final temperature of recrystallization is higher than 30°C, not only unfavorable results will be brought about in yield, but also the ratio of resorcinol to the total of resorcinol and hydroquinone contained in the mother liquor will be less than 85 %, and thereby the successive separation will be considerably disadvantageous.

Therefore, it is important that the ratio of resorcinol to the total of resorcinol and hydroquinone contained in the mother liquor resulting from the first stage separation is 85 % or higher, but such ratio also depends upon the ratio of resorcinol to the total of resorcinol and hydroquinone contained in the feed mixture. In principle, any feed mixture having any ratio of resorcinol to the total of resorcinol and hydroquinone can be subjected to the present separation process. However, the desirable ratio of resorcinol to the total of resorcinol and hydroquinone contained in the feed mixture is 30 % or more for obtaining a ratio of resorcinol to the total of resorcinol and hydroquinone of 85 % or more in the mother liquor resulting from the first stage separation as well as the substantially operable slurry concentration. When the ratio of resorcinol is less than 30 %, it is sometimes better to remove hydroquinone from the feed mixture as much as possible at first, and then subject the feed mixture to the present separation process.

The mother liquor obtained by the first stage separation is distilled at a temperature of not more than 90°C to remove methanol therefrom, and then so adjusted that a ratio of water to the total of resorcinol, hydroquinone and water contained in the mother liquor may be 15–30 %. Then, the temperature is adjusted to 10°–50°C to bring the mother liquor into a slurry state. By filtration of the slurry, crystals of resorcinol having an absolute purity of 99 % or higher can be obtained (second stage separation of the resorcinol-rich mother liquor).

The resulting filtrate is returned to the first stage separation, or the second stage separation of the resorcinol-rich mother liquor, or these two separations upon division at any proportion for retreatment, depending upon the ratio of resorcinol to the total of resorcinol and hydroquinone contained in the filtrate. If the ratio of water exceeds 30 % in the mixture in the second stage separation of the resorcinol-rich mother liquor, resorcinol is hard to be deposited as crystals. On the other hand, at the ratio of water of 15 %, the slurry concentration reaches about 50 %, which is almost an upper limit to the ordinary handling. Even if the amount of the deposited crystals is increased, the ratio of water of 15 % or less is not desirable in view of the deterioration in purity of resorcinol and difficulty in the handling.

On the other hand, the crystals obtained by the first stage separation are so adjusted that a ratio of water to the total of resorcinol, hydroquinone and water may be 5 to 90 % when a ratio of hydroquinone to the total of resorcinol and hydroquinone contained in the crystals is approximately 90 %, or the ratio of water may be 20 to 80 % when the ratio of hydroquinone to the total of resorcinol and hydroquinone contained in the crystals is approximately 50 %, and then heated at a temperature of not more than 90°C. Then, the temperature is adjusted to 10° to 50°C, thereby the mixture is brought into a slurry state. By filtering the slurry, crystals of hydroquinone having an absolute purity of 99 % or more can be obtained (second stage separation of hydroquinone-rich crystal).

The resulting filtrate is returned to the first stage separation together with the filtrate of the second stage separation of the resorcinol-rich mother liquor or to the second stage separation of the hydroquinone-rich crystal, or to these two upon division at any proportion for retreatment, depending upon the ratio of resorcinol to the total of resorcinol and hydroquinone contained in the filtrate. When the ratio of hydroquinone to the total of resorcinol and hydroquinone is 90 %, and the ratio of water is 40 % in the mixture in the second stage separation of the hydroquinone-rich crystal, the slurry concentration will be about 50 %, and when the ratio of water is 20 %, the slurry concentration will be 70 %. Therefore, the desirable ratio of water is in a range of 40 to 90 %. When the ratio of water exceeds 90 %, the crystals are, on the contrary, hard to be deposited. When the ratio of hydroquinone to the total of resorcinol and hydroquinone is 50 %, and the ratio of water is 20 %, the slurry concentration will be about 40 %. At the ratio of water of less than 20 %, the purity of hydroquinone is lowered, and on the contrary, at the ratio of water of more than 80 %, the crystals are hard to be deposited.

Separation of crystals and mother liquor from the slurry mixture can be carried out by the well known means, for example, centrifuge, aspiration filtration, pressure filtration, etc., but since the retaining of mother liquor on the surfaces of crystals lowers the purity of resorcinol or hydroquinone, it is desirable to completely remove the mother liquor from the surfaces of the crystals. It is possible to increase the purity of the crystals by washing the crystals with methanol, water or their mixture, if required. The resulting washing solution containing resorcinol or hydroquinone can be returned, in any amount, to an appropriate step within the present separation process, depending upon the ratio of resorcinol or hydroquinone to the total of resorcinol and hydroquinone. Therefore, there is no substantial loss of resorcinol and hydroquinone due to the washing directed to said improvement of purity.

Such effective recycling of the filtrates and washing solution is made possible only by the complete separation of resorcinol and hydroquinone from each other according to the present invention, which can be attained only by changing kinds of solvents mixing ratio of solvents in solvent mixture and mixing ratio of the solvent mixture to the feed mixture. This is one of great features of the present invention.

Now, the present invention will be described in detail below by way of examples, which are only illustrative, but not limitative In the examples, parts and % are by weight.

EXAMPLE 1

100 parts of a mixture consisting of 70 parts of resorcinol and 30 parts of hydroquinone is charged into a glass reactor provided with a reflux condenser and a stirrer, and then 37 parts of a solvent mixture consisting of 33.3 parts of methanol and 3.7 parts of water is added to the reactor. Temperature of the reactor is elevated to 75°C, and then the reactor is slowly cooled down to 0°C, while stirring the mixture in the reactor. The resulting slurry is filtered in a centrifuge, whereby 32.3 parts of crystals consisting of 26 parts of hydroquinone, 3 parts of resorcinol, 2.8 parts of methanol and 0.5 parts of water, and 104.7 parts of filtrate consisting of 67 parts of resorcinol, 4 parts of hydroquinone, 30.5 parts of methanol, and 3.2 parts of water are obtained. The filtrate is distilled at 75°C to distill off 30.5 parts of methanol. 12.8 parts of water is added to the residue, and the resulting mixture is transferred to a reactor similar to the above, and cooled down to 30° C, while stirring the mixture. The resulting slurry is centrifuged to separate crystals and a filtrate. The resulting crystals are dried, whereby 36 parts of crystals of resorcinol is obtained. Only a trace of hydroquinone is contained in the crystals.

On the other hand, the filtrate consists of 4 parts of hydroquinone, 31 part of resorcinol and 16 parts of water, and can be returned to the first stage separation for reseparation together with a fresh mixture of resorcinol and hydroquinone to be separated.

32.3 parts of crystals obtained by said first stage separation is admixed with 48 parts of water, heated at 75°C to distill off 1.5 parts of methanol together with 3 parts of water, and then cooled down to 30°C. The resulting slurry is centrifuged to separate crystals and a filtrate. The resulting crystals are dried, whereby 16 parts of pure hydroquinone crystals is obtained. Only a trace of resorcinol is contained in the crystals. On the other hand, the filtrate consists of 10 parts of hydroquinone, 3 parts of resorcinol, and 45 parts of water, and can be returned to the first stage separation in the same manner as with the filtrate resulting from said separation of the resorcinol-rich fraction.

By carrying out one overall run of three separations consisting of the first and second stage separations of resorcinol-rich mother liquor, and the second stage separation of hydroquinone-rich crystal, almost half amounts each of resorcinol and hydroquinone contained in the feed mixture can be obtained as pure products. The filtrates resulting from these two second stage separations can be returned to the first stage separation without any loss, and therefrom the feed mixture can be completely separated into pure resorcinol and pure hydroquinone, respectively.

The grade of the resorcinol thus obtained meets not only the quality specification set forth as to the resorcinol as a tar intermediate in Japan Industrial Standard (JIS K4119), but also the first grade (reagent) resorcinol specification of Japan Industrial Standard (JIS K9032). When the resorcinol is further recrystallized in water at a slurry concentration of about 40 %, a grade that will meet the resorcinol special grade (reagent) can be obtained.

On the other hand, the hydroquinone thus obtained meets, as such, the specification of photographic hydroquinone set forth in Japan Industrial Standard (JIS K7713). When the hydroquinone is further recrystallized in water, a grade that will meet the hydroquinone special grade (reagent) of Japan Industrial Standard (JIS K8738) can be readily obtained.

EXAMPLE 2

A mixture containing 50 parts of resorcinol and 50 parts of hydroquinone, which has been obtained from benzene and propylene as starting materials through the well known alkylation, oxidation, extraction, cleavage and purification, is charged into a reactor of the same type as in Example 1, and a solvent mixture consisting of 17.5 parts of methanol and 7.5 parts of water is added thereto. Temperature of the resulting mixture is elevated to 85°C, and then the mixture is cooled down to 10°C, while stirring the mixture. The resulting slurry is centrifuged, whereby 65.5 parts of crystals consisting of 11.7 parts or resorcinol, 46.8 parts of hydroquinone, 2 parts of water and 5 parts of methanol, and 59.5 parts of a filtrate consisting of 38.3 parts of resorcinol, 3.2 parts of hydroquinone, 5.5 parts of water and 12.5 parts of methanol are obtained.

The filtrate is admixed with 2.4 parts of water, then distilled to remove 12.5 parts of methanol, and centrifuged at 30°C, whereby 22.2 parts of crystals of resorcinol is obtained. The crystals are colored in light brown, but contains only 0.2 % less of hydroquinone. 27.2 parts of the resulting filtrate consists of 16.1 part of resorcinol, 3.2 parts of hydroquinone, and 7.9 parts of water, and can be returned to a separation step at any stage for reseparation.

On the other hand, 65.5 parts of the crystals obtained in the first stage separation is admixed with 56.5 parts of water, then distilled to remove 5 parts of methanol, and centrifuged at 30°C. The crystals thus obtained are dried at 70°C in a drier, whereby 39.0 parts of hydroquinone is obtained.

78 parts of the resulting filtrate consists of 11.7 parts of resorcinol, 7.8 parts of hydroquinone, and 58.5 parts of water, and can be returned to separation step at any stage, for example, the first stage separation or the second stage separation of the hydroquinone-rich crystals, at the desired proportion.

Therefore, by carrying out one overall run of separations consisting of the first and second stage separations of resorcinol-rich mother liquor, and the second stage separation of hydroquinone-rich crystals, more than 40 % of resorcinol and less than 80 % of hydroquinone can be obtained as pure products, respectively, from the mixture of resorcinol and hydroquinone, and the mixture can be completely separated into resorcinol and hydroquinone, by repeatedly treating the individual remaining filtrates containing the resorcinol and hydoquinone not separated by said overall run of three operations in the same manner as above. The loss of resorcinol and hydroquinone is in a substantially negligible range at that time.

As to the quality of the products, resorcinol can meet the Japan Industrial Standard (JIS K4119) and hydroquinone also can meet the Japan Industrial Standard (JIS K7713), even after the repeated recycling treatment.

When 22.2 parts of crystals of resorcinol is further recrystallized in water at a 40 % slurry concentration, 15 parts of resorcinol that can meet the special grade (reagent) specification of Japan Industrial Standard is obtained.

When 39.0 parts of crystals of hydroquinone is likewise further recrystallized in water, 33 parts of hydroquinone that can meet the special grade (reagent) of Japan Industrial Standard is obtained.

What is claimed is:

1. A process of separating resorcinol and hydroquinone from their admixture to obtain a hydroquinone-rich fraction and a resorcinol-rich fraction which contains greater than approximately 85% resorcinol based on the weight of the resorcinol and hydroquinone present in the resorcinol-rich fraction which comprises heating a mixture of resorcinol and hydroquinone at any mixing ratio with 15 to 30% by weight of an aqueous methanol solution containing 5 to 50% by weight of water, based on the total of the admixture and the aqueous methanol solution, cooling to a temperature of −10° to 30°C to form a slurry, and separating the resulting slurry into a resorcinol-rich mother liquor which contains greater than approximately 85% by weight resorcinol and a hydroquinone-rich-crystal fraction.

2. A process for separating resorcinol and hydroquinone from their admixture, which comprises:

a first step of heating a mixture of resorcinol and hydroquinone with 15 to 30% by weight of an aqueous methanol solution containing 5 to 50% by weight of water, based on the total of the admixture and the aqueous methanol solution, and cooling to a temperature of −10°C to 30°C to form a slurry, separating the resulting slurry into hydroquinone-rich crystals and a resorcinol-rich mother liquor;

a second step of distilling the resorcinol-rich mother liquor obtained in the first step at a temperature of not more than 90°C, to remove methanol, adjusting the water content of the mother liquor to 15 to 30% by weight on the basis of the total of resorcinol, hydroquinone and water in the mother liquor, then adjusting the temperature to 10° to 50°C to bring the mother liquor into a slurry state, and separating the resulting slurry into crystals of resorcinol and a filtrate, and recycling the filtrate to the beginning of the first or second step;

a third step of adjusting the water content of the hydroquinone-rich crystals obtained in the first step to 5 to 90% by weight, based on the total of resorcinol, hydroquinone and water, when a ratio of hydroquinone to a total of resorcinol and hydroquinone is approximately 90% by weight in the crystals, or to 20 to 80% by weight, when the ratio is approximately 50% by weight, heating the resulting mixture at a temperature of not more than 90°C, then adjusting the temperature to 10°C to 50°C to bring the mixture into a slurry state, separating the slurry into crystals of hydroquinone and a filtrate, and recycling the filtrate to the beginning of the first or third step.

* * * * *